(12) United States Patent
Deering

(10) Patent No.: US 6,169,554 B1
(45) Date of Patent: *Jan. 2, 2001

(54) CLIP TESTING UNIT FOR A THREE-DIMENSIONAL GRAPHICS ACCELERATOR

(75) Inventor: Michael Deering, Los Altos, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/885,278

(22) Filed: Jun. 30, 1997

(51) Int. Cl.$^7$ .................................................. G06T 15/30
(52) U.S. Cl. ............................................................ 345/434
(58) Field of Search ...................................... 345/427, 434

(56) References Cited

U.S. PATENT DOCUMENTS

| 4,888,712 | * 12/1989 | Barkans et al. ...................... 345/434 |
| 4,901,064 | 2/1990 | Deering . |
| 5,003,497 | * 3/1991 | Priem ................................... 345/419 |
| 5,396,585 | * 3/1995 | Fujii et al. ........................... 345/434 |
| 5,517,611 | 5/1996 | Deering . |
| 5,982,380 | * 11/1999 | Inoue et al. .......................... 345/434 |
| 6,005,590 | * 12/1999 | Negishi et al. ....................... 345/505 |

OTHER PUBLICATIONS

Foley et al., *Second Edition in C—Computer Graphics—Principles and Practice*, Addison–Wesley Publishing Company, 1990, pp. 124–127.

* cited by examiner

Primary Examiner—Mark R. Powell
Assistant Examiner—Thu Nguyen
(74) Attorney, Agent, or Firm—Conley, Rose & Tayon, P.C.; Jeffrey C. Hood

(57) ABSTRACT

A clip testing unit within a graphics accelerator for comparing a value of a given homogeneous coordinate of a vertex position of a polygon relative to a plurality of clipping planes. The plurality of clipping planes includes both regular and guard band clipping planes. The clip testing unit includes registers for receiving and storing a W value corresponding to the vertex position, as well as a coordinate input register for receiving and storing the given homogeneous coordinate. The W value is conveyed to a guard band W generation unit, which generates a guard band W value in response thereto. The clip testing unit also includes a clip compare unit coupled to receive the W value, the guard band W value and the value of the given coordinate. The clip compare unit receives and compares the W value and the value of the given coordinate, generating one or more first clip signals in response thereto. The one or more first clip signals indicate whether the value of the given coordinate is outside of a regular clipping space defined by the regular clipping planes. Furthermore, the clip compare unit receives and compares the guard band W value and the value of the given coordinate, generating one or more second clip signals in response thereto. The one or more second clip signals indicate whether the value of the given coordinate is outside of a guard band clipping space defined by the guard band clipping planes. Because the first and second clip comparisons are performed substantially concurrently by the clip compare unit, the clip testing performance of the graphics accelerator is advantageously increased.

24 Claims, 10 Drawing Sheets

Computer

Fig. 10

| Bits | Contents |
|---|---|
| 0 | ZZ MP WW 33 |
| 1-2 | |
| 2-3 | YY MP GG WW 33 |
| 4-5 | YY MP WW 33 |
| 6-7 | XX MP GG WW 33 |
| 8-9 | XX MP WW 33 |
| 10-11 | ZZ MP WW 22 |
| 12-13 | YY MP GG WW 22 |
| 14-15 | YY MP WW 22 |
| 16-17 | XX MP GG WW 22 |
| 18-19 | XX MP WW 22 |
| 20-21 | ZZ MP WW 11 |
| 22-23 | YY MP GG WW 11 |
| 24-25 | YY MP WW 11 |
| 26-27 | XX MP GG WW 11 |
| 28-29 | XX MP WW 11 |

Clip Bits Register 660

CLIP TESTING UNIT FOR A THREE-DIMENSIONAL GRAPHICS ACCELERATOR

FIELD OF THE INVENTION

The present invention relates to a 3-D graphics accelerator, and more particularly to a floating point processor for a 3-D graphics accelerator with improved clip testing capabilities.

DESCRIPTION OF THE RELATED ART

A three dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three-dimensional geometry data that defines three-dimensional graphics elements for display on a video output device. The application program causes the host processor to transfer the geometry data to the graphics accelerator. The graphics accelerator receives the geometry data and renders the corresponding graphics elements on the display device.

Applications which display three-dimensional graphics require a tremendous amount of processing capabilities. For example, for a computer system to generate smooth 3-D motion video, the computer system is required to maintain a frame rate or update rate of between 20 to 30 frames per second. This requires a 3-D graphics accelerator capable of processing over a million graphics primitives per second.

In general, 3-D graphics accelerators have had three major bottlenecks which limit performance. A first bottleneck is the transfer of geometric primitive data from main memory to the graphics accelerator over the system bus. A second bottleneck is the vertex processing requirements (such as transformation, lighting, and set-up) which are performed on the geometric primitives by the graphics accelerator prior to rendering. A third bottleneck is the speed at which pixels from processed primitives can be filled into the frame buffer.

Vertex processing operations are typically performed by dedicated hardware in the graphics accelerator. This hardware is commonly pipelined, such that each stage of the pipeline effectuates a distinct operation on the vertices of the received geometric primitive. The operations may be performed in either fixed or floating-point math.

In standard graphics processing, each geometric primitive is tested to determine if it is entirely within a defined coordinate region, or viewport. If a portion of the primitive is outside the viewport, the primitive is completely or partially "clipped". Clipping involves rejecting that portion of an object which lies outside a clipping boundary defining the viewport. A clipped portion of an object is typically discarded from the graphics pipeline and therefore not rendered.

Referring to FIG. 1, a video display screen 8 is shown, including a viewport 10 defined by a regular clipping boundary 12. Triangles 20, 21, 22, 24, 28, and 30 represent geometric primitives which are inputs to a 3-D graphics accelerator configured to render objects on video display screen 8. Triangles 22 and 24 share a common edge 26.

In standard clipping operation, triangle 20, which lies wholly within viewport 10, is not clipped. On the other hand, triangle 30, which is completely outside regular clipping boundary 12, is completely clipped, and therefore rejected from further processing. Triangles 21, 22, 24, and 28, however, are only partially outside viewport 10. When these primitives are rendered on video display screen 8 in the final stages of the graphics pipeline, only the portion within viewport 10 is displayed.

Clipping is a time-consuming operation. A large number of calculations are required to clip the various properties of a primitive (including coordinate and color data) to the edge of a viewing region such as regular clipping boundary 12. To increase performance, it is therefore desirable to reduce the number of primitives for which clipping is performed.

For this reason, the concept of guard band clipping was developed. In guard band clipping, a second clipping boundary, encompassing the regular clipping boundary, is defined for the viewport. Primitives which lie partially outside the regular clipping boundary but inside the guard band clipping boundary are not clipped. The pixels within these primitive that are outside the viewport but inside the guard band clipping boundary are instead rejected in a later stage of the graphics pipeline. Because this deferred rejection is typically performed faster than the standard clipping operation, performance of the graphics accelerator is advantageously increased by performing guard band clipping.

In FIG. 1, the guard band clipping region is defined by guard band clipping boundary 14. In contrast to regular clipping, triangles 21, 22, and 24 are not clipped when guard band clipping is implemented, since they lie entirely within boundary 14. Triangle 28 is partially clipped (to boundary 12) since a portion of the primitive lies outside boundary 14.

If the guard band clipping boundary is defined to be too much larger than the regular clipping boundary, however, the deferred rejection of pixels in the guard band region may become more time-consuming than the normal clipping procedure. Additionally, problematic numeric overflows may occur in vertex processing operations subsequent to the clip test for primitive vertices in a large guard band region. The guard band region is therefore generally designed to be a small percentage larger than the viewport.

In prior art designs, guard band clip testing generally results in fewer objects being clipped. This advantage comes at the expense of having to perform an extra comparison to determine whether a vertex is outside the guard band clipping boundaries (in addition to the comparison for the regular clipping boundary). The guard band comparison requires more processing time, and hence limits system performance. Additionally, guard band clipping may not be performed consistently in prior art designs, resulting in a shared edge (such as edge 26 in FIG. 1) being clipped differently for different triangles.

A graphics accelerator with improved clip testing capabilities is therefore desired.

SUMMARY OF THE INVENTION

The present invention comprises a clip testing unit within a graphics accelerator for comparing a value of a given coordinate of a vertex position of a polygon relative to a plurality of clipping planes. The plurality of clipping planes includes both regular clipping planes and guard band clipping planes. The clip testing unit includes a coordinate input register for receiving the value of the given coordinate of the vertex position. The vertex position is represented in homogenous coordinates, and thus includes a corresponding W value. The clip testing unit further includes a W input register for receiving and storing the W value, as well as a guard band W generation unit coupled to the W input register for generating a guard band W value in response to the W value. Still further, the clip testing unit includes a guard band W register coupled to the guard band W generation unit which receives and stores the guard band W value.

The clip testing unit also includes a clip compare unit coupled to the W input register, the guard band W register and the coordinate input register. The clip compare unit receives and compares the W value and the value of the given coordinate, generating one or more first clip signals in response thereto. The one or more first clip signals indicate whether the value of the given coordinate is outside of a regular clipping space defined by the regular clipping planes. Furthermore, the clip compare unit receives and compares the guard band W value and the value of the given coordinate, generating one or more second clip signals in response thereto. The one or more second clip signals indicate whether the value of the given coordinate is outside of a guard band clipping space defined by the guard band clipping planes.

Because the first and second clip comparisons are performed substantially concurrently by the clip compare unit, the clip testing operation may be performed in a single cycle. The clip testing performance of the graphics accelerator is thus advantageously increased. This increased performance makes guard band clipping an effective means of reducing the number of time-consuming clipping operations.

BRIEF DESCRIPTION OF THE DRAWINGS

A better understanding of the present invention can be obtained when the following detailed description of the preferred embodiment is considered in conjunction with the following drawings, in which:

FIG. 10 depicts one embodiment of a clip bits register according to the preferred embodiment of the present invention.

DETAILED DESCRIPTION OF THE EMBODIMENTS

Figure 2:
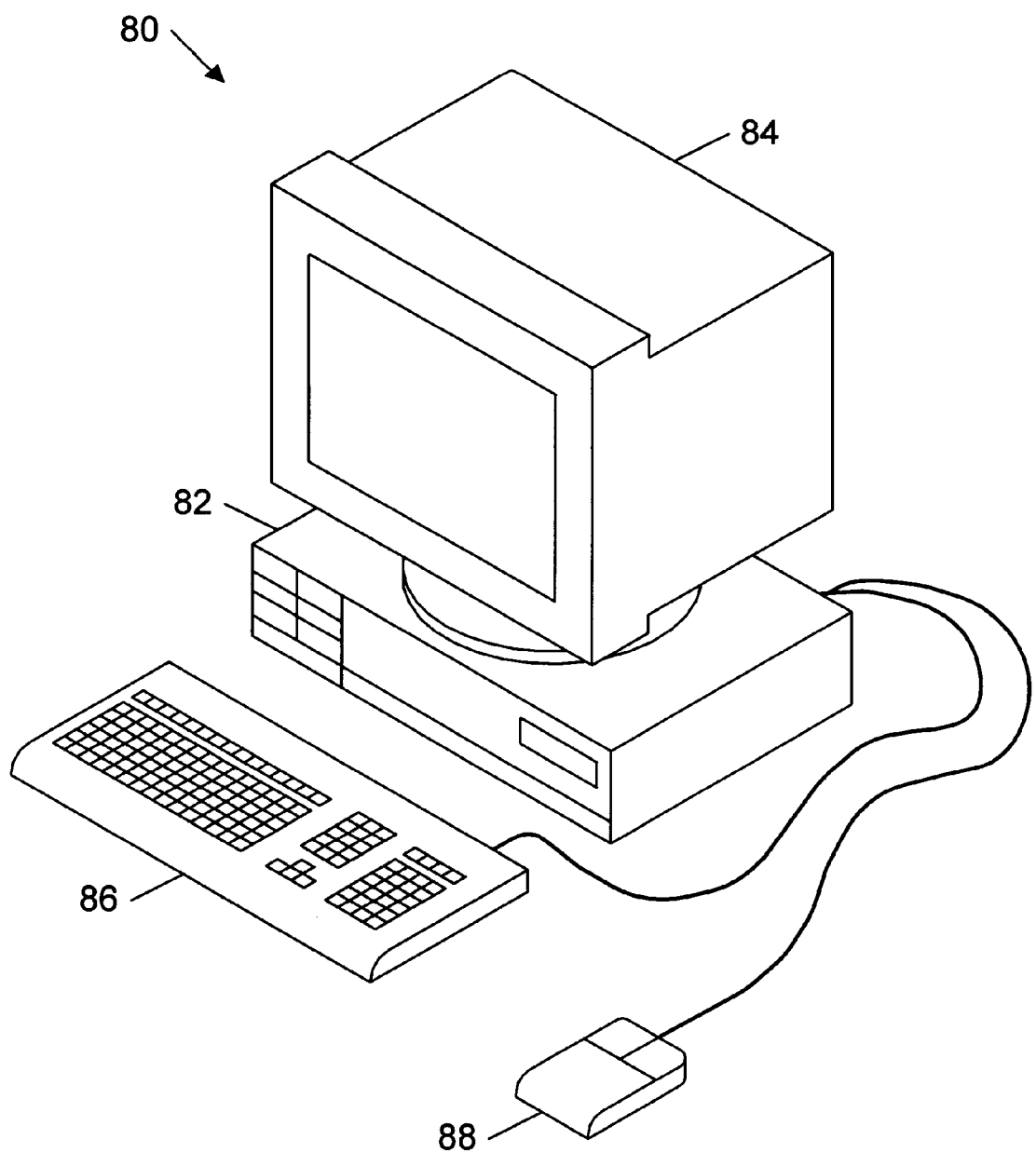
FIG. 2 illustrates a computer system which includes a three dimensional (3-D) graphics accelerator according to the present invention.

FIG. 2—Computer System

Referring now to FIG. 2, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software may be executed by the computer system 80 to display 3-D graphical objects on the video monitor 84.

Figure 3:
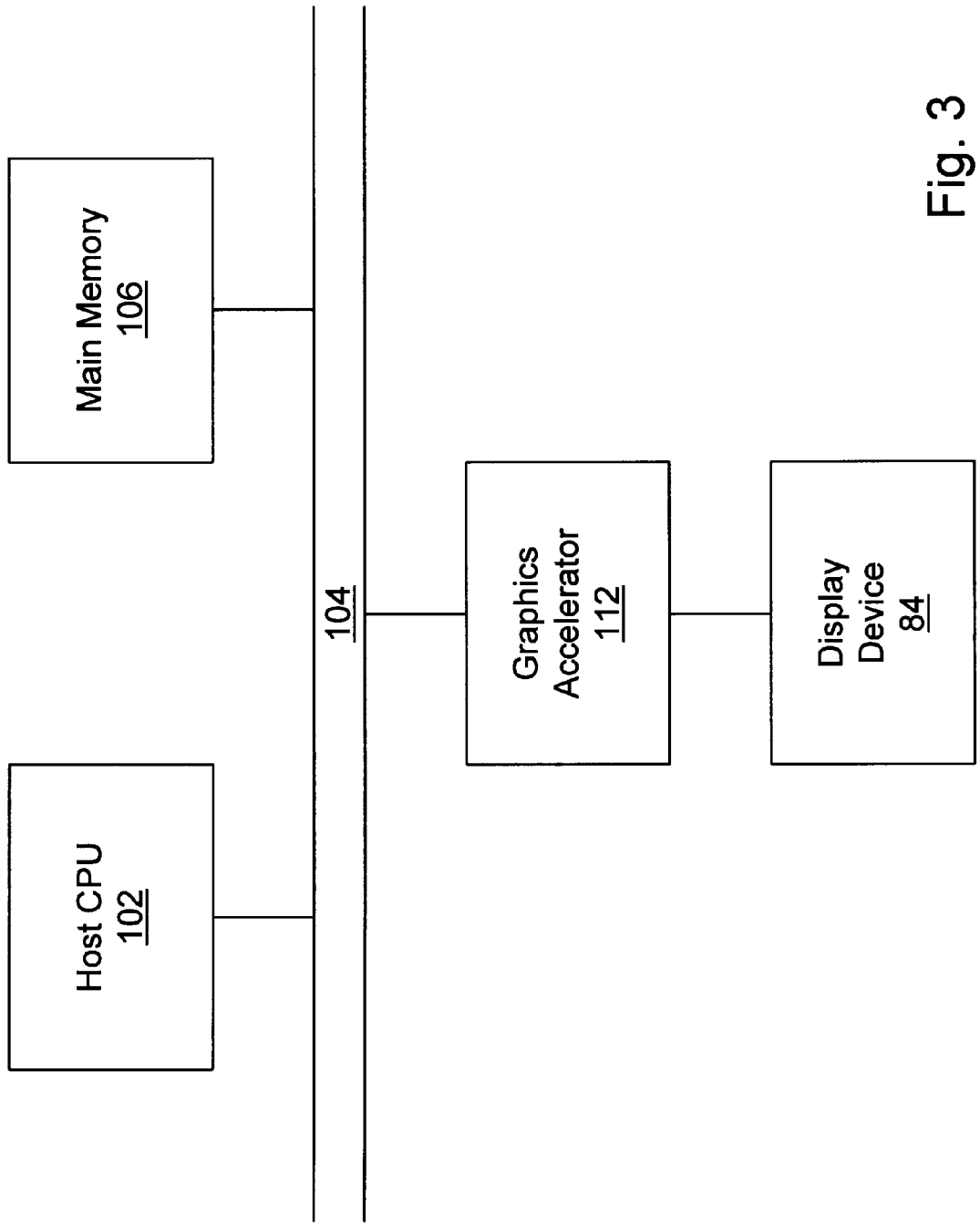
FIG. 3 is a simplified block diagram of the computer system of FIG. 1.

FIG. 3—Computer System Block Diagram

Referring now to FIG. 3, a simplified block diagram illustrating the computer system of FIG. 2 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. Further, the graphics accelerator 12 may be coupled through one or more other buses to bus 104.

The host processor 102 may transfer information to and from the graphics accelerator 112 according to a programmed input/output (I/O) protocol over the host bus 104. In the preferred embodiment, data is transferred from the system memory 106 to the graphics accelerator 112 using a CPU copy (bcopy) command. In an alternate embodiment, the graphics accelerator 112 accesses the memory subsystem 106 according to a direct memory access (DMA) protocol, or through intelligent bus mastering.

A graphics application program conforming to a application programmer interface (API) such as OpenGL generates commands and data that define a geometric primitive such as a polygon for output on display device 84. Host processor 102 transfers these commands and data to memory subsystem 106. Thereafter, the host processor 102 operates to transfer the data to the graphics accelerator 112 over the host bus 104. Alternatively, the graphics accelerator 112 reads in geometry data arrays using DMA access cycles or bus mastering cycles over the host bus 104. In another embodiment, the graphics accelerator 112 is coupled to the system memory 106 through a direct port, such as the Advanced Graphics Port (AGP) promulgated by Intel Corporation. As described below, the 3-D graphics accelerator in computer system 80 exhibits increased performance for processing geometric primitives to be rendered as three-dimensional objects on display device 84.

Figure 4:
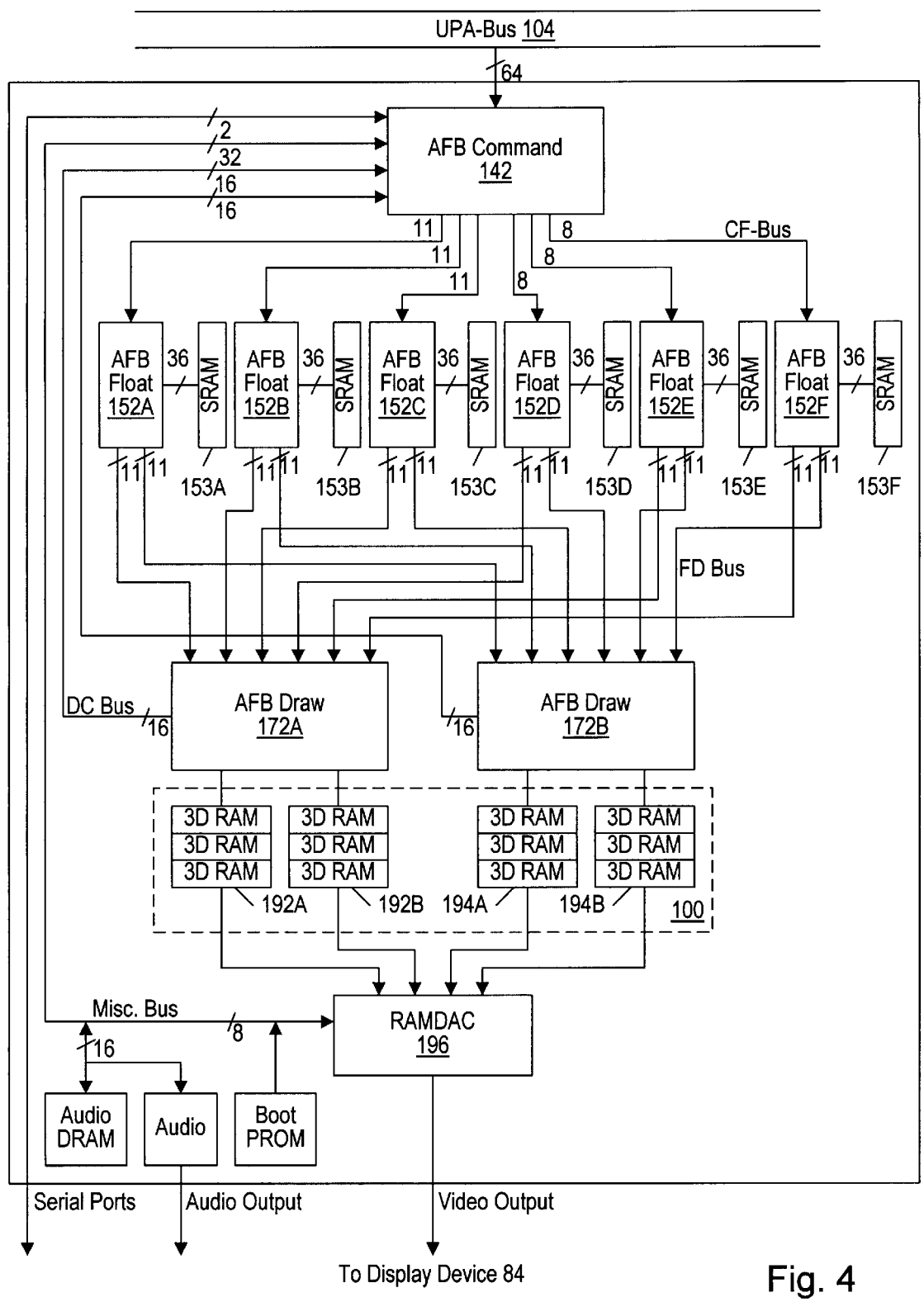
FIG. 4 is a block diagram illustrating the 3-D graphics accelerator according to the preferred embodiment of the present invention.

FIG. 4—Graphics Accelerator

Referring now to FIG. 4, a block diagram is shown illustrating the 3-D graphics accelerator 112 according to the preferred embodiment of the present invention. As shown, the 3-D graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the 3-D graphics accelerator 112 includes command block 142 which interfaces to the host bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression when necessary.

The command block 142 interfaces to a plurality of floating point blocks 152. The 3-D graphics accelerator 112 preferably includes up to six floating point blocks labeled 152A–152F, as shown. The floating point blocks 152A–152F receive high level drawing commands and generate graphics primitives, such as triangles, lines, etc. for rendering three-dimensional objects on the screen. The floating point blocks 152A–152F perform transformation, clipping, lighting and set-up operations on received geometry data. Each of the floating point blocks 152A–152F connects to a respective memory 153A–153F. The memories 153A–153F are preferably 32 k×36-bit SRAM and are used for microcode and data storage.

Each of the floating point blocks 152A–F connects to each of two drawing blocks 172A and 172B. The 3-D graphics accelerator 112 preferably includes two draw blocks 172A and 172B, although a greater or lesser number may be used. The draw blocks 172A and 172B perform screen space rendering of the various graphics primitives and operate to sequence or fill the completed pixels into the 3DRAM array. The draw blocks 172A and 172B also function as 3DRAM control chips for the frame buffer. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw block 172A couples to the two 3DRAM banks 192A and 192B, and the draw block 172B couples to the two 3DRAM banks 194A and 194B, respectively. Each bank comprises three 3DRAM chips, as shown. The 3DRAM memories or banks 192A–B and 194A–B collectively form the frame buffer, which is 1280×1024 by 96 bits deep. The frame buffer stores pixels corresponding to 3-D objects which are rendered by the drawing blocks 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the "floating point blocks" 152 are preferably implemented as separate chips. In the preferred embodiment, up to six floating point processors 152A–F may be included. Each of the drawing blocks or processors 172A and 172B also preferably comprise separate chips. For more information on different aspects of the graphics accelerator architecture of the preferred embodiment, please see related co-pending application Ser. No. 08/673,492 entitled "Three-Dimensional Graphics Accelerator With Direct Data Channels for Improved Performance" and related co-pending application Ser. No. 08/673,491 entitled "Three-Dimensional Graphics Accelerator Which Implements Multiple Logical Buses Using Common Data Lines for Improved Bus Communication", both filed on Jul. 1, 1996.

As described above, command block 142 interfaces with host bus 104 to receive graphics commands and data from host CPU 102. Received geometric primitives are then transferred to floating point blocks 152 for a variety of operations, including transformation, clip testing, lighting, and set-up. As will be described below, graphics accelerator 112 includes a floating point block 152 which is configured to perform both regular and guard band clip testing in a single cycle. The advantage of guard band clipping (fewer objects require the time-intensive clipping procedure) is thus achieved without incurring an additional comparison test for the guard band clipping region. The general operation of floating point blocks 152 is described with reference to FIG. 5, with the operation of the floating point (F-core) of blocks 152 described more particularly with reference to FIG. 6. The clip test units are discussed in FIGS. 8 through 10.

Figure 5:
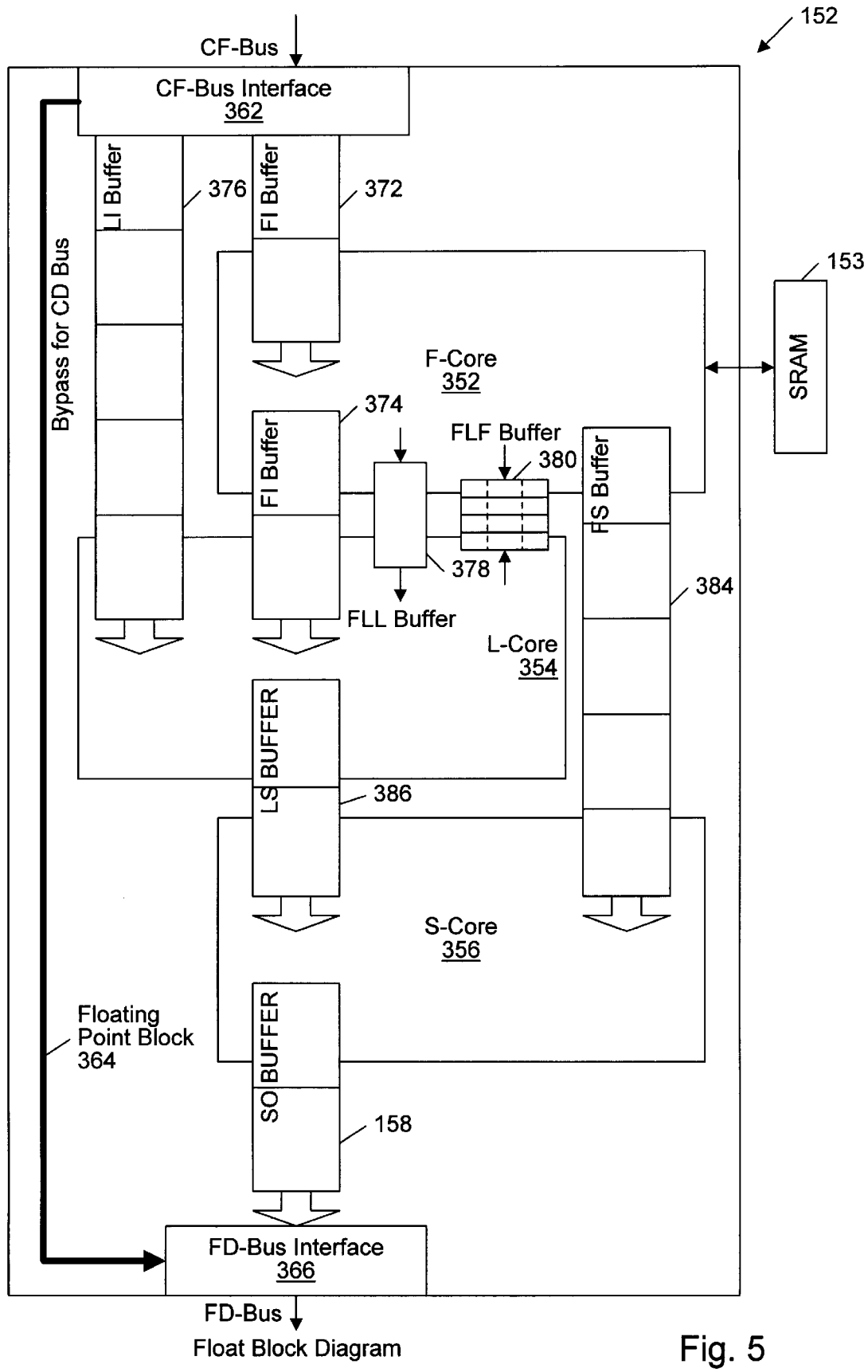
FIG. 5 is a block diagram illustrating one of the floating point processors in the 3-D graphics accelerator according to the preferred embodiment of the present invention.

FIG. 5—Floating Point Processor Block Diagram

Referring now to FIG. 5, a block diagram illustrating one of the floating point processors 152 according to the preferred embodiment of the present invention is shown. Each of the respective floating point processors 152A–152F are preferably identical, and thus only one is described here for convenience. As shown, each of the floating point blocks 152 includes three main functional units or core processors, these being floating point core (F-core) 352, lighting core (L-core) 354, and setup core (S-core) 356. The F-core block 352 is coupled to receive data from the CF-bus transferred from the Command block 142. The F-core block 352 provides output data to each of the L-core block 354 and the S-core block 356. The L-core block 354 also provides data to the S-core block 356. The S-core block 356 provides output data to the FD bus.

The F-core block 352 performs all floating point operations, including geometry transformation, clip testing, face determination, perspective division, and screen space conversion. The F-core block 352 also performs clipping when required. In the preferred embodiment, the F-core block 352 is fully programmable, using a 36-bit micro instruction word stored in a 32 k word SRAM 153.

The L-core block 354 performs substantially all lighting calculations using on-chip RAM-based microcode. The L-core block 354 also includes an efficient triple-word design for more efficient lighting calculations. This triple-word design operates with a 48-bit data word comprising 16-bit fixed point values. Thus one instruction can perform the same function on all three color components (RGB) or all three components of a normal ($N_x$, $N_y$, and $N_z$) in one cycle. The math units comprised in the L-core block 354 automatically clamp values to the allowed ranges, thus requiring no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line. For more information on the internal architecture of the floating point blocks, see related co-pending application Ser. No. 08/676, 096 titled "Floating Point Processor for a Three-Dimensional Graphics Accelerator Which Includes Floating Point, Lighting, and Set-up Cores for Improved Performance", filed Jul. 1, 1996.

As shown, each of the floating point blocks 152 includes CF-bus interface logic 362 which couples to the CF-bus. Each of the floating point blocks 152 includes FD-bus interface logic 366 which couples to the FD-bus. Each floating point block 152 includes a bypass bus or data path 364 which serves as the data transfer path through a respective floating point block 152 for the CD bus. Data which is sent over the CD bus, i.e., which is sent directly to the FD bus, travels on the data transfer bus 364, thus bypassing the floating point logic comprised in the floating point block 152.

In general, data which is provided to the floating point block 152 can have one of three destinations, these being the F-core block 352, the L-core block 354, or directly out to the FD bus, i.e., a CD bus transfer. In the preferred embodiment, data which is destined for the F-core block 352 comprises 32-bit words, including 32-bit IEEE floating point numbers and other 32-bit data. Data destined for the L-core block 354 comprises 48-bit words comprising three 16-bit fixed point numbers.

As shown in FIG. 5, the floating point block 152 includes a plurality of input and output buffers which provide communication between the F-core block 352, L-core block 354, and S-core block 356. As depicted, the floating point block 152 includes a float input buffer (FI buffer) 372 which receives data from the CF-bus which was provided by the command block 142. The FI buffer 372 is double buffered and holds 32 32-bit entries in each buffer. The first word, word zero, stored in the FI buffer 372 comprises an op code which informs the F-core block 352 which microcode routine to dispatch for the received geometric primitives. Only the header and X, Y and Z coordinates are provided to this buffer when processing geometric primitives.

The floating point block 152 also includes an F-core to L-core buffer (FL buffer) 374. The FL buffer 374 is double buffered and holds 16 16-bit entries in each buffer. The F-core block 352 operates to write or combine three F-core words into one L-core word which is provided to the FL buffer 374. From the L-core perspective, each buffer in the FL buffer 374 appears as five 48-bit entries. During lighting operations, three X, Y, Z coordinates are sent from the F-core block 352 through the FL buffer 374 to the L-core block 354. These three X, Y, Z coordinates are used to compute eye direction.

The floating point block 152 includes an L-core input buffer (LI buffer) 376 which receives data sent across the CF-bus which was provided from the command block 142 and provides this data to the L-core block 354. The LI buffer 376 comprises five buffers, each of which hold seven 48-bit entries. These seven 48-bit entries comprise three vertex normals, three vertex colors and one word with three alpha values. The FI buffer 372 and the LI buffer 376 collectively comprise the floating point block input buffer.

The floating point block 152 also includes an FLL buffer 378, which connects between the F-core block 352 and the L-core block 354. The FLL buffer 378 is a FIFO used for transmitting lighting and attenuation factors from the F-core block 352 to the L-core block 354. These attenuation factors comprise three X,Y,Z position values, three attenuation values, three ambient light values, and one attenuation shift word containing three packed values. An FLF buffer 380 is also provided between the F-core block 352 and the L-core block 354. The FLF buffer is a bi-directional buffer used for communicating data between the F-core block 352 and the L-core block 354 under F-core control.

An L-core to S-core buffer (LS buffer) 386 is coupled between the L-core block 354 and the S-core block 356. The LS buffer 386 is a double buffer with each buffer holding four 48-bit words.

The floating point block 152 also includes an F-core to S-core buffer (FS buffer) 384 which is used for transferring data from the F-core block 352 to the S-core block 356. The FS buffer comprises five buffers which each hold 32 32-bit values. These five buffers are designed to match the pipeline stages of the L-core block 354, these being the two FL buffers, the two LS buffers, plus one primitive which may be stored in the L-core block 354. Data transferred from the F-core block 352 through this buffer to the S-core block 356 includes a dispatch code that indicates which microcode procedure to run in the S-core block 356.

Finally, the floating point block 152 includes an S-core output buffer (SO buffer) 158 which is coupled between the S-core block 356 and the FD bus interface 366. The SO buffer 158 collects data to be sent across the FD bus to the respective draw processors 172A–172B. The SO buffer 158 is double buffered and holds 32 32-bit words in each buffer. The SO buffer 158 holds up to two primitives comprising fixed point data in the order needed by the respective draw processors 172A–172B. The SO buffer 158 includes a separate status register which indicates how many words are valid so that the minimum number of cycles are used to transfer the data across the bus. The SO buffer 158 comprises the floating point block output buffer 158.

Figure 6:
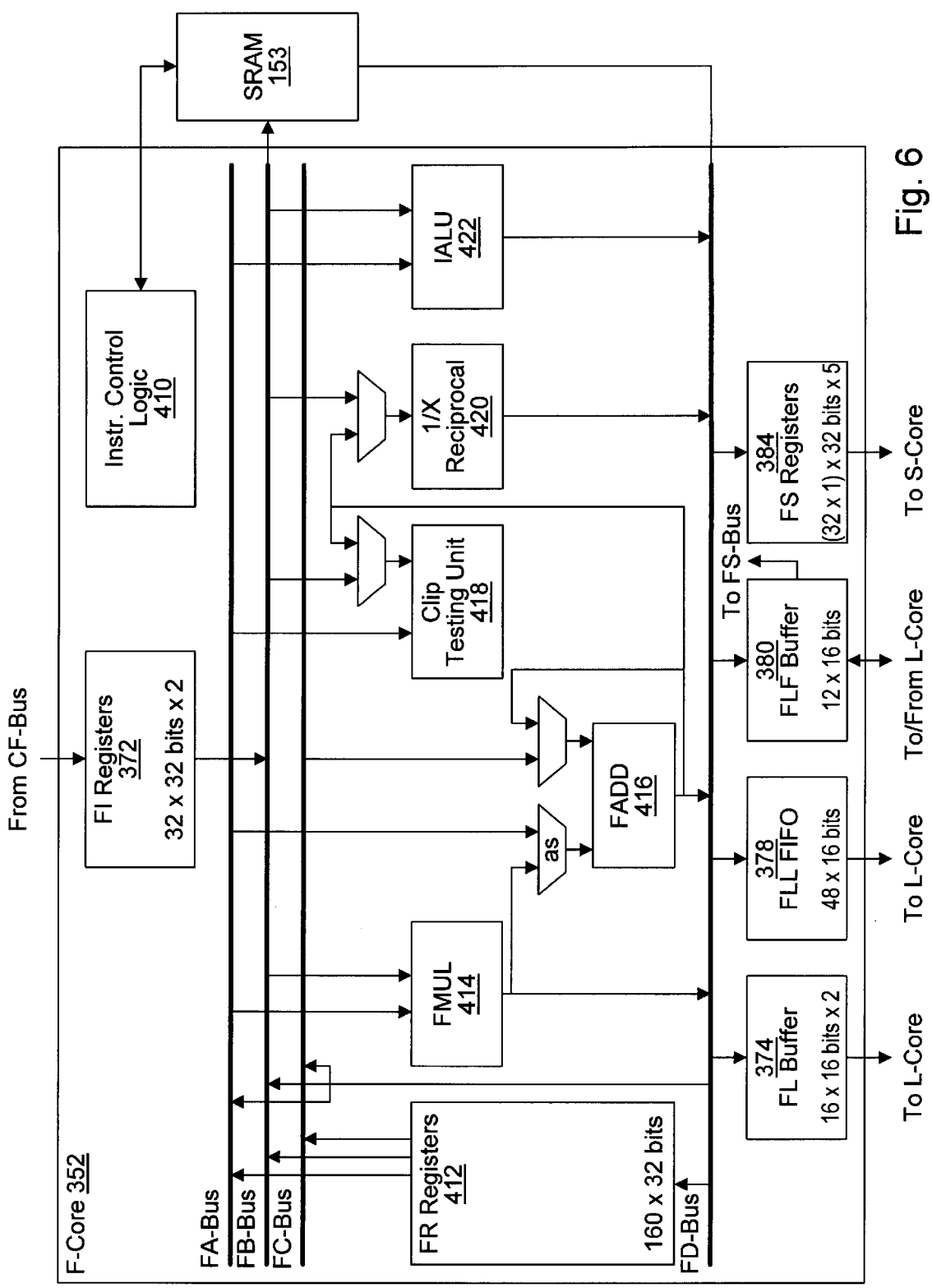
FIG. 6 is a block diagram illustrating the F-Core block of the floating point processors according to the preferred embodiment of the present invention.

FIG. 6—F-Core Block Diagram

Referring now to FIG. 6, a block diagram illustrating the F-Core block 352 in each of the floating point processors 152 is shown. F-core processor 352 receives geometry primitive data and performs floating point operations on the received geometry data. The F-core processor 352 performs operations such as transforming vertex positions from model space to view space, performing clipping operations on received geometry data, performing perspective division to convert received vertex information to screen space, and determining if a triangle is front-facing or back-facing. The F-core processor also performs some lighting operations.

As shown, the F-core processor 352 includes FR registers 412 which store constants and intermediate values. The FR register file 412 preferably includes 160 registers and also includes three read ports and one write port. The FR register file 412 couples to three buses referred to as the FA-bus, the FB-bus and the FC-bus. The F-core processor 352 includes three buses to allow multiply accumulate operations to occur once per clock cycle.

The F-core processor 352 includes a floating point multiplier (FMUL) 414, a floating point adder (FADD) 416, a clip testing unit 418, a reciprocal unit 420, and an integer arithmetic-logic unit (IALU) 422. Each of these math units are coupled to one or more of the FA, FB, and FC buses.

The floating point multiplier (FMUL) 414 receives inputs from the FA and FB buses and outputs either directly to the FD-bus or to a floating point adder (FADD) 416. The floating point adder 416 receives two inputs. One side of the floating point adder 416 receives its input from either the FC-Bus or from the floating-point multiplier 414. The other input of the adder 416 is coupled to receive data from either the FC-Bus or from the output of the adder 416. Thus the output of the adder 416 is fed back into one of its inputs. This loop back or feedback feature allows values to be accumulated from several multiples without having to pass back through the FR registers 412. The adder 416 is thus designed to feed a value back through after four cycles, which exactly matches the matrix multiple operation used to transform vertices.

The inclusion of dedicated clip compare circuitry in clip testing unit 418 obviates the necessity of the floating point adder 416 having to perform this function. The inclusion of dedicated clip compare circuitry also saves the extra cycles that would have been needed to perform clip testing. The clip testing unit 418 performs comparisons for both regular and guard band clipping planes concurrently. The clip testing unit 418 thus advantageously allows four comparisons (positive and negative regular clipping planes and positive and negative guard band clipping planes) in one instruction cycle. The details of clip testing unit 418 are discussed further below.

The reciprocal unit 420 receives its input from either the FB-Bus or the result of the floating-point add unit 416. Math units other than the reciprocal unit 420 require a fixed number of cycles to produce a result, and then the result is put onto the FD-Bus. The reciprocal unit 420 holds its result until an instruction is issued to read the reciprocal result.

The integer arithmetic-logic unit (IALU) 422 performs addition, subtraction, boolean operations, bit test/set/clear/operations, and barrel shifts. It also performs an inverse square root function.

The F-core processor 352 also includes instruction control logic 410, which interfaces to microcode and data stored in SRAM array 153. Instruction control logic 410 effectuates operation of commands specified by command block 142 via microcoded commands stored in SRAM 153. Although not explicitly shown in FIG. 6, instruction control logic 410 interfaces to multiplier 414, adder 416, clip testing 418, etc., to sequence the flow of instructions.

F-Core Communication Buffers

As discussed above, the F-core processor 352 includes five different buffers that are used for inter-chip communication. The FI registers 372 are input only and contain data received from the command block 142 across the CF-Bus. The FI registers 372 appear as 32 entries in the overall register address space. Data appears in the FI registers after executing a "need_FI" instruction, which halts instruction sequencing if a complete primitive is not available in the input buffer. For primitives which are smaller than 32 words (i.e. most primitives), not all 32 entries are valid. When a "free_FI" instruction is executed, the buffer is immediately able to receive more data. This buffer is double-buffered so that under normal circumstances data may be read into one buffer while data in the other buffer is being used. Then, when "free_FI" and "need_FI" are executed, the next buffer full of data will be available.

The FL buffer 374 is normally used to send an XYZ direction vector to L-Core 354 for each vertex. When triangles are clipped, the FL buffer 374 is used to send the clipped RGB color values as well as the clipped alpha value. All values stored into the FL buffer 374 are 32-bit fixed-point, but only 16 bits are kept in the buffer, aligned to match the 16-bit fixed-point format of the L-Core block 354. When L-core 354 removes data from the other side of the FL buffer 374, the L-core block 354 pulls each set of three words out as one 48-bit word. Like the FI buffer 372, the FL buffer 374 is also double buffered and controlled by "need" and "free" instructions.

The FLL FIFO 378 is used for passing the attenuation factors for local light sources (both point and spot lights). Because the FLL FIFO 378 is a FIFO, the FLL FIFO 378 passes data using reads and writes rather than by directly using "need" and "free" instructions. The FLL FIFO 378 also appears as only one single register to both F-Core 352 and L-Core 354. It should be noted that when F-Core 352 issues a "need FLL" instruction, there must be at least three empty locations in the FLL buffer 378 before it is available.

The FLF Buffer 380 is used for transferring data both directions between F-Core 352 and L-Core 354. Values are written to specific addresses in the buffer 380 and read on the other side from corresponding addresses. Synchronization is achieved using two flag registers, one for passing data from F-Core 352 to L-core 354 and the other for the opposite direction. Microcode guarantees that the FLF buffer 380 is only used in one direction at a time.

The color and alpha values computed during the lighting calculations are stored in the FLF buffer 380 as well as the LS buffer 386 when lighting is completed. If F-Core 352 sets the clip-pending mode, the values in the FLF buffer 380 are read back by F-Core 352 and the values in the LS buffer 386 are ignored. In the normal case where no clipping occurs, the FLF buffer 378 is ignored and the LS buffer values are sent on to S-Core 356.

When F-Core 352 needs to "borrow" the L-Core functions unit for spot light exponent computations, the three values are sent using the FLF buffer 378. Later, the three result values are sent back in the FLF buffer 378. In both cases, only the least significant 16 bits of the 48-bit word are used for transferring data.

The FS registers 384 are output only and are used to send data to S-Core for setup computations. All data to be processed by S-Core 356 is in one of the two fixed-point formats: s1.30 or s11.20. One primitive may have up to 32 words of data in the FS registers 384 plus one word containing header information, consisting of an op-code and several control bits. Rather than being double-buffered like many of the other buffers, there are five buffers in the FS registers 384 to account for the two FL buffers 374, the two LS buffers 386 (out of L-Core), plus one primitive that is being processed in L-Core 354. The FS registers 384 are switched using "need" and "free" instructions.

Figure 7:
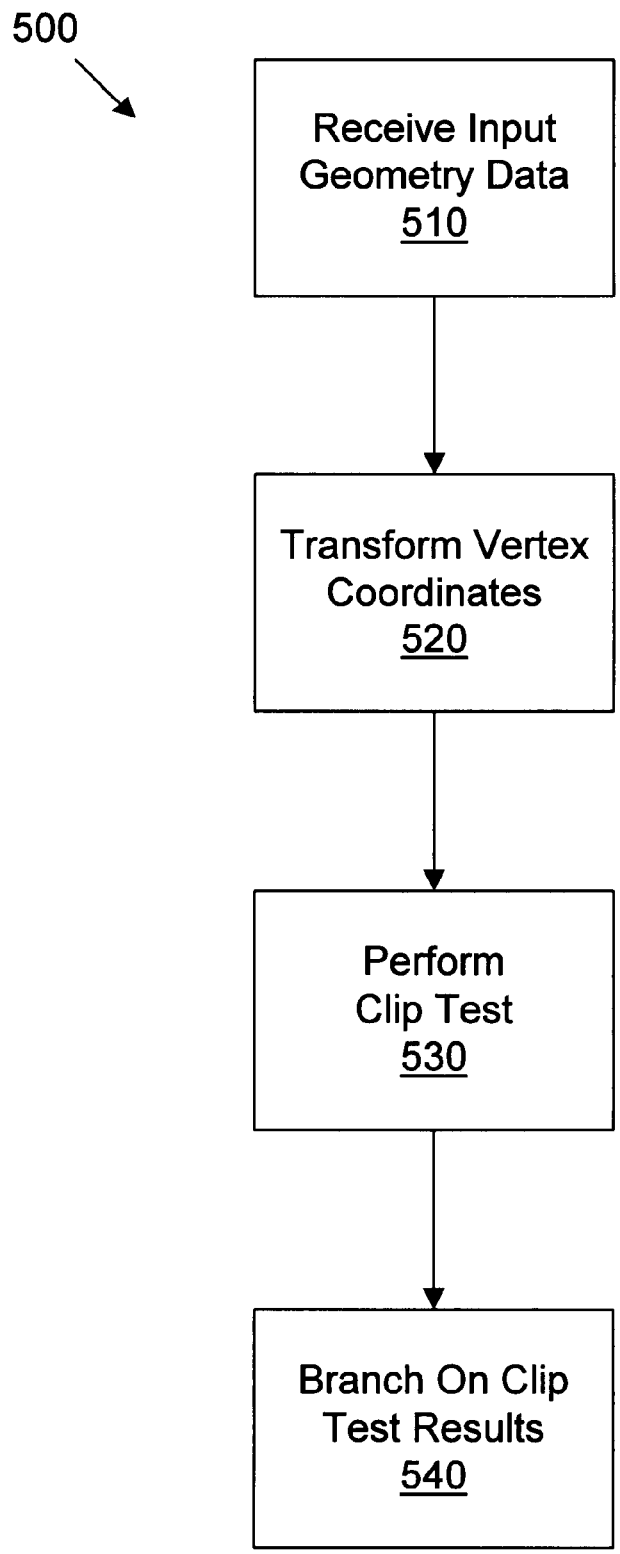
FIG. 7 is a flowchart illustrating a portion of the processing performed by the F-core block.

FIG. 7—F-core Processing

Referring now to FIG. 7, a flowchart is shown illustrating a portion of the operation of F-core block 352, including clip testing. As depicted, method 500 includes step 510, in which input geometry data is received into F-core block 352 via FI register file 372. The input geometry data defines vertices for primitives such as polygons which are to be processed in F-core block 352. One of the initial operations performed on these vertices is transformation of the vertex coordinates from model space (as specified by the application program on host CPU 102) to clipping space in step 520. The transformation process and its relation to clip testing are discussed in further detail below. Once vertex coordinates are converted to clipping space, a clip test is performed in step 530. The clip test is performed relative to a set of regular clipping planes, and, optionally, a set of guard band clipping planes. The results of the clip test are stored in a clip bits register. In step 540, F-core block 352 performs a conditional branch to a next microcode routine based on the results of the clip test. For example, processing of the geometry input data proceeds differently if the clip test determines a vertex lies outside a clipping space than if the clip test determines the vertex is within the clipping space. This operation is performed by branch logic not shown in FIG. 6 for simplicity.

View Transformation and Homogeneous Coordinates

When host CPU 102 transfers geometry primitives to graphics accelerator 112, these primitives are typically expressed in terms of three-dimensional model space coordinates. Before processing by subsequent pipeline stages, these coordinates first undergo a view transformation operation, performed in F-core block 352. The view transformation operation comprises multiplying a transform matrix with a matrix representing the input coordinate values. Multiplication of the input coordinate value matrix with the transform matrix performs a variety of operations, including mapping the model space coordinates to a pre-defined eye point and transforming coordinates to provide a perspective projection of an object.

In order to more efficiently process vertex information, many computer graphics systems convert vertices to homogeneous coordinates. In this manner, the translation, rotation, and scaling operations may all be treated as matrix multiply operations. In homogeneous coordinates, a fourth value, W, is added to the X-Y-Z position data received from host CPU 102 for a given vertex. W is initially given a value of 1.0. As will be shown below, after multiplication by the transform matrix, the resulting W (which has a new value) can then be compared to the transformed X-Y-Z coordinates to effectuate a clip test.

The following example illustrates the use of homogeneous coordinates to perform view transformation. For this example, consider an eye point of (0.0, 0.0, 4.0) and a viewable window (against which objects are clipped in the X and Y directions) which goes from −2.0 to 2.0 in both X and Y, and is located at Z=0.0. Presume that the front and back clipping planes are at Z=3.5 and Z=−10.0, respectively. One possible transform

| | | | |
|---|---|---|---|
| 2.0 | 0.0 | 0.0 | 0.0 |
| 0.0 | 2.0 | 0.0 | 0.0 |
| 0.0 | 0.0 | 1.047407 | −1.0 |
| 0.0 | 0.0 | −3.25926 | 4.0 |

Table 1 below shows various untransformed points in model space, along with the corresponding transformed points in homogeneous coordinates which result from multiplication with the transform matrix shown above.

TABLE 1

| | Untransformed Coordinates | | | | Transformed Coordinates | | | |
|---|---|---|---|---|---|---|---|---|
| | X | Y | Z | W | X' | Y' | Z' | W' |
| 1 | 0.0 | 0.0 | 3.499 | 1.0 | 0.0 | 0.0 | 0.498926 | 0.501 |
| 2 | 0.0 | 0.0 | 3.0 | 1.0 | 0.0 | 0.0 | −0.037037 | 1.0 |
| 3 | 0.0 | 0.0 | 1.0 | 1.0 | 0.0 | 0.0 | −2.18519 | 3.0 |
| 4 | 0.0 | 0.0 | 0.0 | 1.0 | 0.0 | 0.0 | −3.25926 | 4.0 |
| 5 | 0.0 | 0.0 | −5.0 | 1.0 | 0.0 | 0.0 | −8.62963 | 9.0 |
| 6 | 0.0 | 0.0 | −9.0 | 1.0 | 0.0 | 0.0 | −12.9259 | 13.0 |
| 7 | 0.0 | 0.0 | −9.99 | 1.0 | 0.0 | 0.0 | −13.9893 | 13.99 |
| 8 | 0.0 | 0.0 | 3.8 | 1.0 | 0.0 | 0.0 | 0.822222 | 0.2 |
| 9 | 0.0 | 0.0 | −15.0 | 1.0 | 0.0 | 0.0 | −19.3704 | 19.0 |
| 10 | 1.5 | 0.2 | 0.0 | 1.0 | 3.0 | 0.4 | −3.25926 | 4.0 |
| 11 | 1.5 | 0.2 | −5.0 | 1.0 | 3.0 | 0.4 | −8.62963 | 9.0 |
| 12 | 1.5 | 0.2 | 3.0 | 1.0 | 3.0 | 0.4 | −0.03703 | 1.0 |

In the first seven rows in Table 1, the X and Y values are all 0.0, while W is given the initial value of 1.0. The Z values in these seven rows run from just inside the front clipping plane to just inside the back clipping plane. It is noted from Table 1 that in the transformed coordinates, Z' and W' are related. As the Z values approach the Z value of the front clipping plane (Z=3.5), Z' becomes closer to W'. As the Z values approach the Z value of the back clipping plane (Z=−10.0), the absolute value of Z' approaches the value of W'. In rows 8 and 9, examples are shown for Z coordinates which are outside of the front and back clipping planes, respectively. For Z values in front of the clipping Ed plane (e.g., Z=3.8), the resulting Z' value is larger than W'. Similarly, for Z values behind the back Z clipping plane (e.g., Z=−15.0), the absolute Z' value is greater than W'. One result of the view transformation for the Z coordinate, then, is to provide Z' and W' coordinates which can be compared to effectuate a clip test.

The effect of perspective on X and Y coordinates can be seen in rows 10 and 11. After transformation, the X' values in rows 10 and 11 are equal, as are the Y' values. Because the coordinates in row 11 are farther from the eye point, however, they must be drawn closer to the center of the screen to provide the illusion of depth. This is accomplished by performing a perspective divide operation, in which the X', Y', and Z' coordinates are all normalized to W'. After perspective division for the coordinates in row 10, the resulting X'/W' value is 0.75, while the value for the coordinates in row 11 is 0.33. Any normalized coordinate greater than 1.0 or less than −1.0 is considered outside the clipping planes of the window specified by the transform matrix. Row 12 shows an example of a coordinate that is clipped in the X direction. Because the Z coordinate is close to the front clipping plane, the X and Y coordinates are drawn farther from the origin. In the case of the X coordinate, the resulting X' coordinate is larger than W', and is therefore clipped.

The use of homogeneous coordinates and transform matrices thus provides a convenient framework for performing clip testing in computer graphics.

Figure 8:
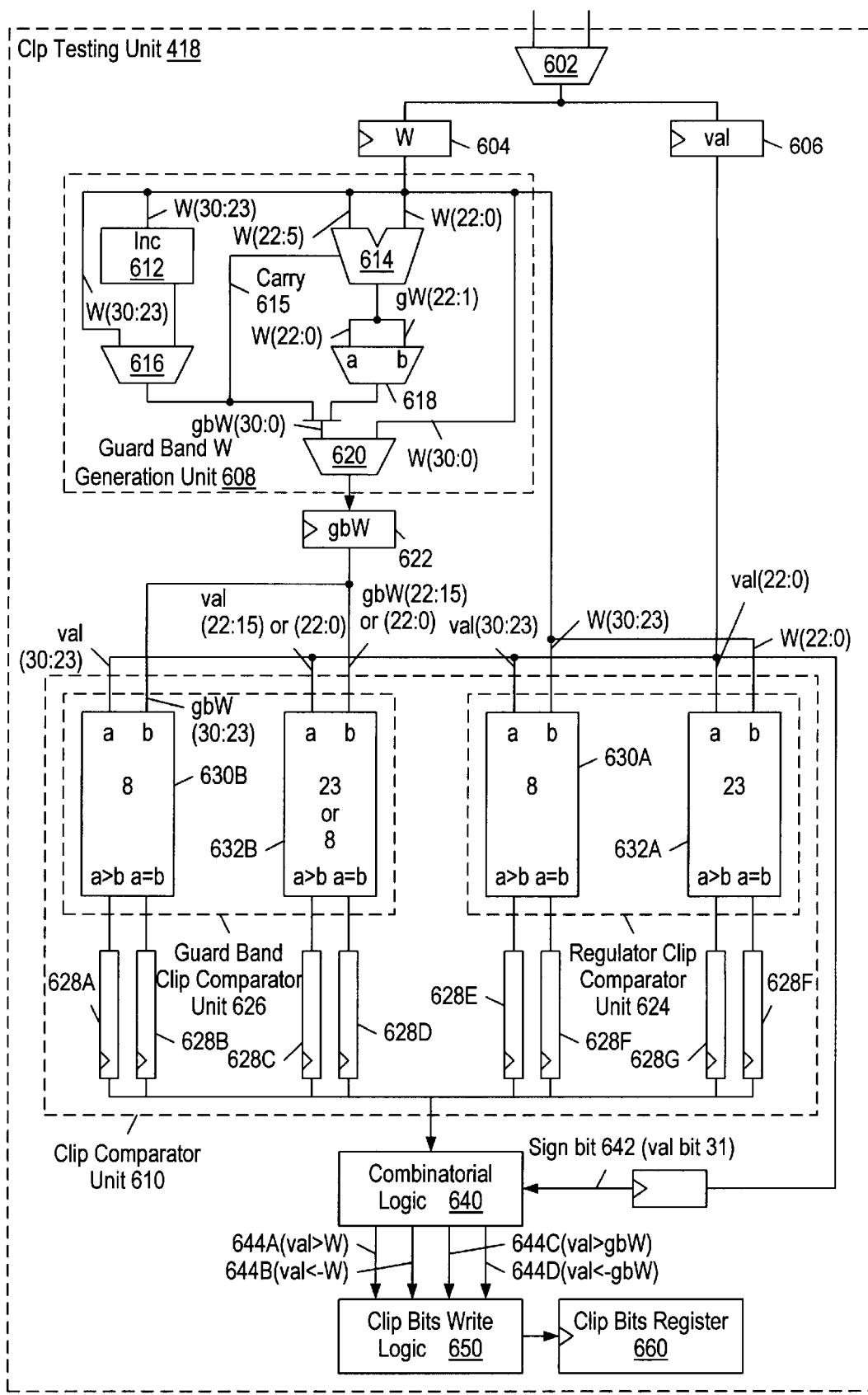
FIG. 8 is a block diagram illustrating a clip compare unit according to the preferred embodiment of the present invention.

FIGS. 8—Clip Testing Unit Hardware

Referring now to FIG. 8, clip testing unit 418 is shown as implemented in the preferred embodiment of the invention. As depicted, clip testing unit 418 includes a W input register 604 and a coordinate value input register 606. Clip testing unit 418 further comprises a guard band W generation unit 418 coupled to receive the value of register 604 as input, and convey an output value to a guard band W register 622. The output of registers 604, 606, and 622 are all conveyed to clip compare unit 610, which comprises a regular clip comparator unit 624 and a guard band clip comparator unit 626. The outputs of clip compare unit 610 are conveyed to a combinatorial logic block 640 via a plurality of clip signal output registers 628. In turn, combinatorial logic block 640 generates a plurality of clip output signals 644, which are conveyed to a clip bits register 660 via a clip bits write logic block 650.

An input multiplexer 602 is employed to load both W input register 604 and input coordinate register 606. W input register 604 is used for storing a transformed W value for a vertex position of a geometric primitive which is represented in homogeneous coordinates. (As described above, the untransformed value of W is by convention 1.0). In one embodiment, W input register 604 is loaded in response to a particular microcode instruction issued by F-core block 352.

The transformed W value stored in W input register 604 is conveyed to guard band W generation unit 608. The function of guard band W generation unit 608 is to generate a guard band W value in response to a given W value. In the embodiment shown, guard band generation unit 608 stores a guard band W value to a guard band W register 622 in a clock cycle subsequent to receiving a value from register 604.

In one embodiment, a guard band W generation unit includes a register that is configured to store a full-range IEEE floating point number. The value in this register is multiplied by an input W value to generate a guard band W value. The advantage of this approach is that the register may changed as needed by host processor 102. While it would not typically be desirable to change the multiplication constant for a given object, it may be desirable to change the constant in some circumstances, such as in between inner loops of a block of code. One downside of such an approach, however, is the additional space needed for a full-range multiplier.

In another embodiment, a register is used in a guard band generation unit which may be written by host processor 102 as needed, only with a smaller range. Less space is required in this implementation, however, since the size of a multiplier varies with the square of the number of input bits. In another embodiment, the register stores a shift count. This shift count is then used to shift the input W value to the right (effectively performing division by a power of 2). This shifted value is added back to the unshifted W value, thereby generating a guard band W value.

In yet another embodiment, the guard band W generation unit is hardwired to multiply an input W value by a fixed amount. For example, in the preferred embodiment, guard band W generation unit 608 generates a guard band W value in the preferred embodiment by adding $\frac{1}{32}$ of the value of W to W itself, effectively multiplying W by $\frac{33}{32}$, or 1.03. A guard band generation unit may also be implemented in alternate embodiments as either an adder or multiplier. In one embodiment, a multiplier may be designed such that the multiplication constant (e.g., $\frac{33}{32}$) is between a fixed range of numbers to reduce cost. For example, a multiplier may be constructed to multiply a given W value by any number between 1.02 and 1.10 (a typical guard band range).

Figure 1:
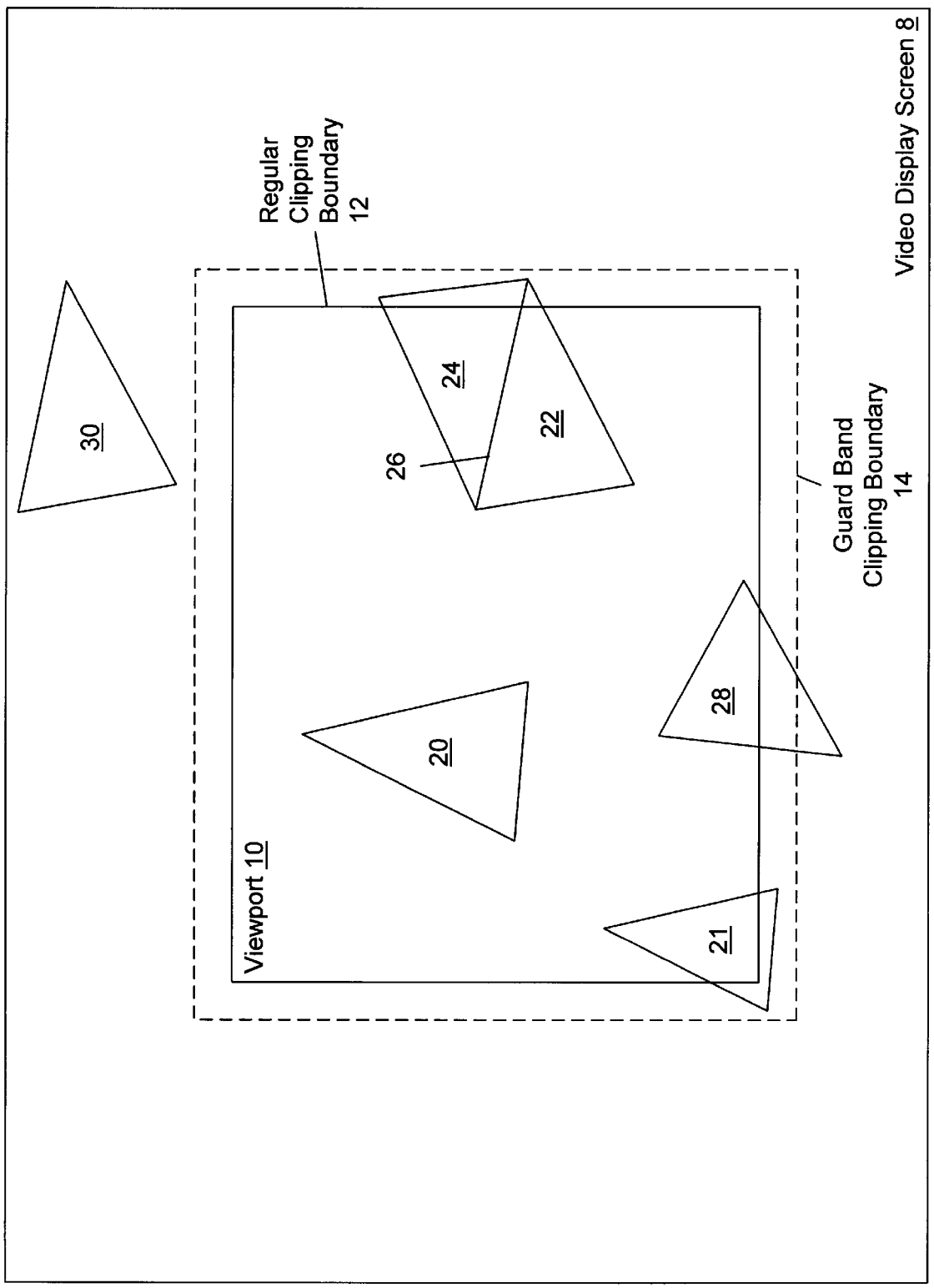
FIG. 1 illustrates regular and guard band clipping regions in relation to a plurality of geometric primitives.

In the preferred embodiment, the guard band W value is $\frac{33}{32}$ of a corresponding W value. It is noted that this ratio is chosen as a design convenience. In other embodiments, other ratios of guard band W:W may be used. While the particular ratio chosen is not important, the operation of guard band generation unit 608 should be consistent, always generating the same guard band W value for a given W value. If this is not the case, triangles sharing a common edge (such edge 26 shown in FIG. 1) may be clipped differently, causing undesirable visual effects.

In one embodiment, the value stored in register 604 and conveyed to guard band W generation unit 608 is in 32-bit IEEE floating point format, which is summarized below in Table 2. (The values in registers 606 and 622 are in the same format).

TABLE 2

| Bit(s) | Field |
|---|---|
| 31 (MSB) | Sign bit (S) |
| 30:23 | Exponent Bias (E) |
| 22:0 | Mantissa (F) |

The value of a floating point number V in EEE format can then be represented by $V=(-1)^{s*} 2^{E-bias}*(1.F)$.

Guard band W generation unit 608 includes an incrementer 612, a 23-bit adder 614, and multiplexers 616, 618, and 620. Incrementer 612 receives the exponent portion of the transformed W value, and generates an incremented exponent, which is conveyed to multiplexer 616. Multiplexer 616 also receives the non-incremented exponent portion of the transformed W value, and selects between the two values based on a carry signal 615 generated by 23-bit adder 614. In one embodiment, adder 614 receives the 23-bit mantissa portion of the transformed W value, as well as a shifted version of the mantissa which does not include the least significant five bits. This shifted version is equal to $\frac{1}{32}$ of the original mantissa value; the output of the adder, therefore, is $\frac{33}{32}$, or 103% of the original mantissa. Adder 614 generates carry signal 615 if this addition overflows the range of the adder. If carry signal 615 is active, the incremented version of the exponent is selected from multiplexer 616 and conveyed to multiplexer 620. If carry signal 615 is inactive, however, the original exponent is sent to multiplexer 620. Carry signal 615 also controls multiplexer 618. Multiplexer 618 receives two inputs. The first input (denoted as "a" in FIG. 8) is the new 23-bit mantissa value generated by adder 614. The second input ("b") is the new 23-bit mantissa that results from a carry overflow. Since IEEE floating points are normalized, there is a "hidden 1" left of the implied decimal point. A carry from the fractional mantissa, then, results in a binary "10" left of the decimal point. Since only 23 bits can be retained, the 0 from the left of the decimal point is concatenated with bits 22:1 of the mantissa value generated by adder 614 to form the second 23-bit input to multiplexer 618. As with multiplexer 616, the inputs of multiplexer 618 are selected based on the value of carry signal 615. The outputs of multiplexers 616 and 618 are concatenated and conveyed to multiplexer 620, which also receives the original transformed W value in one embodiment. For guard band clip testing, the concatenated outputs of $616/618$ are selected. The output of guard band W)V generation unit 608 is conveyed to guard band W input register 622.

An input coordinate value is stored into coordinate input register 606 via input multiplexer 602. The value in coordinate input register 606 is used to store a transformed vertex coordinate which is to be clip tested. The transformed W value from register 604., the transformed coordinate value from register 606, and the guard band W value from register 622 are all conveyed to clip compare unit 610. In one embodiment, coordinate input register 606 is loaded and clip testing is performed in response to a particular microcode instruction issued by F-core block 352.

When register 606 is loaded in response to a microcode instruction, regular and guard band clip comparisons are performed concurrently in clip compare unit 610. Unit 610 comprises a regular clip comparator unit 624, a guard band clip comparator unit 626, and a plurality of clip signal output registers 628A–H. Regular clip comparator unit 624 includes regular exponent comparator 630A and regular mantissa comparator 632A, while guard band clip comparator unit 626 includes guard band exponent comparator 630B and guard band mantissa comparator 632B.

The clip test for the regular clipping planes is performed by regular clip comparator unit 624 which compares the coordinate value in register 606 ("val") to the transformed W value stored in register 604 ("W"). Regular mantissa comparator 632A receives the full 23-bit mantissa of both val and W at the a and b inputs, respectively, and conveys results indications "greater than" and "equal to" indications to clip signal output registers 628G–H. These values are conveyed in a subsequent clock cycle to a combinatorial logic block 640. Regular exponent comparator 630A receives the 8-bit exponent portion of both val and W and conveys similar results to the coupled clip signal output registers 628.

The clip test for the guard band clipping planes is performed by guard band clip comparator unit 626 which compares the coordinate value in register 606 ("val") to the guard band W value stored in register 622 ("gbW"). In one embodiment, guard band mantissa comparator 632B receives the full 23-bit mantissa of both val and gbW at the a and b inputs, respectively, and conveys "greater than" and "equal to" indications to clip signal output registers 628C–D. In alternate embodiment, guard band mantissa comparator 632B receives a subset (eight, for example) of the 23 bits of both val and gbW. This embodiment results in a smaller implementation since less bits are compared. The values generated by guard band mantissa comparator 632B are conveyed to clip signal output registers 628C–D, and to combinatorial logic block 640 in a subsequent clock cycle.

In one embodiment, the comparisons performed by clip compare unit 610 do not take into account the sign value (bit 31) of the coordinate value stored in register 606. While the values conveyed to combinatorial logic block 640 by clip compare unit 610 then indicate whether the absolute value of the coordinate is greater than the value of W or gbW (indicating that the coordinate is outside of regular or guard band clipping space), the values do not indicate in which direction (positive or negative) the value is to be clipped. For this reason, sign bit 642 of val is conveyed to combinatorial logic block 640.

In response to sign bit 642 and the values conveyed from clip signal output registers 628, combinatorial logic block 640 generates four clip output signals 644. Clip output signal 644A is set if the coordinate value (including the sign bit) in register 606 is greater than the transformed W value stored in register 604. Clip output signal 644B is set if the coordinate value is less than –W. Similarly, clip output signal 644C is set if the coordinate value is greater than gbW, while 644D is set if the coordinate value is less than –gbW. Clip output signals 644 therefore collectively indicate whether a given coordinate value is outside of any of four specified clipping planes.

Clip output signals 644 are conveyed to a clip bits register 660 via a clip bits write logic block 650. As will be described below with reference to FIG. 10, clip bits register 660 is configured in one embodiment to store the results of clip compare operations for each coordinate of each vertex for a triangle. Because guard band clipping is not typically defined for the Z-direction in computer graphics, each vertex position requires 10-bits to store clip test results (4 for X direction, 4 for Y direction, 2 for Z direction). The three vertices of a triangle thus occupy 30 bits of clip test storage.

Figure 9:
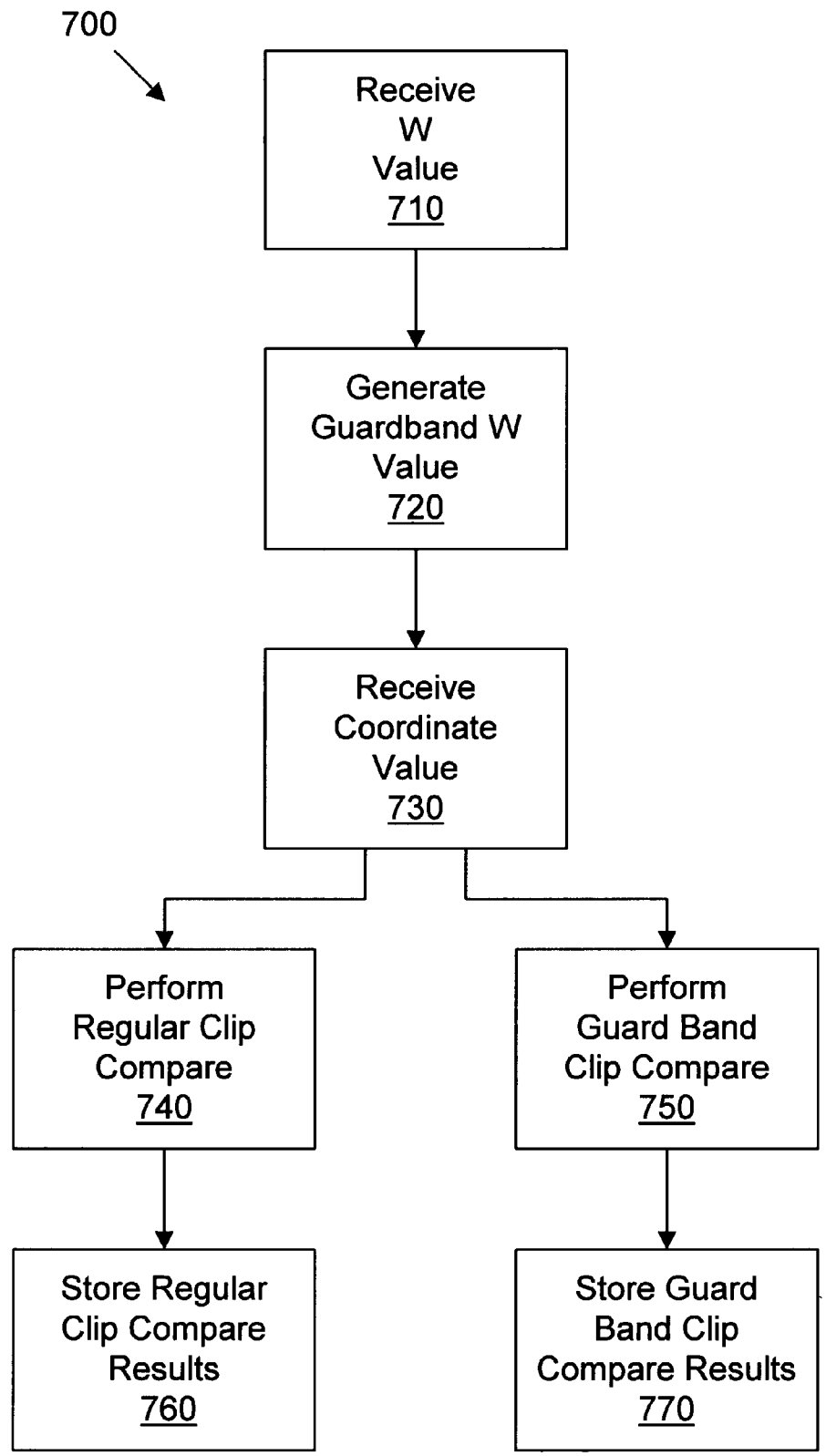
FIG. 9 is a flowchart illustrating a method of clip testing according to the preferred embodiment of the present invention.

FIG. 9—Clip Testing Method

Referring now to FIG. 9, a method 700 is shown depicting the flow of the clip test operation in clip testing unit 418. In step 710, a transformed W value corresponding to a transformed X-Y-Z vertex position is stored into W input coordinate register 604. As described above, transformed X, Y, and Z values may be compared to the transformed W value to effectuate clip testing for the regular clipping planes.

In step 720, this W value is conveyed to guard band W generation unit 608. Guard band W generation unit 608 shifts the value in register 604 five bits to the right and adds this shifted value to the unshifted value, thereby producing a guard band W value which is $33/32$nds of W. Different embodiments of guard band W generation unit 608 may multiply the W value in register 604 by different amounts). The generated guard band W value is stored in register 622. The transformed X and Y values may be ad compared against the guard band W value to effectuate clip testing for the guard band clipping planes.

In step 730, a transformed coordinate value is received and stored into coordinate input register 606. This coordinate value is conveyed to clip compare unit 610, along with the values in registers 604 (W) and 622 (gbW), to perform clip testing. For X and Y coordinates, both regular and guard band clip tests are performed, while only a regular clip test is performed for a Z coordinate.

In steps 740 and 750, both regular and guard band clip tests are performed substantially concurrently. In step 740, the regular clip test is performed by regular clip comparator unit 624. The respective mantissas of the coordinate value and W value are conveyed to regular mantissa comparator 632A, while the respective exponents of the values are conveyed to regular exponent comparator 630A. Collectively, the outputs of comparators 630A and 632A, which are conveyed to combinatorial logic block 640, are used to determine if the coordinate value is outside of the regular clipping planes.

In step 750, the guard band clip test is performed by guard band clip comparator unit 626. The respective mantissas of the coordinate value and the guard band W value are conveyed to guard band mantissa comparator 632B, while the respective exponents of the values are conveyed to regular exponent comparator 630B. Collectively, the outputs of comparators 630B and 632B, which are also conveyed to combinatorial logic block 640, are used to determine if the coordinate value is outside of the guard band clipping planes.

In step 760, combinatorial logic block 640 uses the output of regular clip comparator unit 624 and sign bit 642 to generate clip output signals 644A–B. Clip output signal 644A is set if the coordinate value in register 606 is greater than the W value in register 604. Similarly, clip output signal 644B is set if the coordinate value is less than –W. Similarly in step 770, combinatorial logic block 640 uses the output of guard band clip comparator unit 626 and sign bit 642 to generate clip output signals 644C–D. Clip output signal 644C is set if the coordinate value in register 606 is greater than the gbW value in register 622. Similarly, clip output signal 644D is set if the coordinate value is less than –gbW. After all coordinates of all vertices of a primitive are clip tested, F-core block 352 may branch to subsequent processing routines based on the values stored in clip bits register 660. Since register 660 includes clip test results for each triangle vertex, this allows a trivial accept of an entire polygon with one register read. Additionally, various other complex branches may be performed in one sequential operation.

FIG. 10—Clip Bits Register

Referring now to FIG. 10, one embodiment of clip bits register 660 is shown in accordance with the present invention. As described above, clip bits register 660 is written with values of clip output signals 644 via clip bits write logic block 650. In one embodiment, clip bits register 660 includes at least 30 bits of storage for 10 clip bits per triangle vertex. In FIG. 10, bits 29:20 correspond to a first triangle vertex, bits 19:10 to a second vertex, and bits 9:0 to a third vertex. For each vertex, 4 bits correspond to the X coordinate, 4 bits correspond to the Y, and 2 bits for the Z coordinate. Each bit in FIG. 10 is labeled according to which clip test result is stored. Bit 17, for example, stores the clip comparison for the X coordinate of the second vertex relative to the negative guard band W value (Bit 17 is labeled "XMGW2"=X coordinate Minus Guard Band Plane for Vertex 2).

In the preferred embodiment, only one coordinate of a single vertex is clip tested at a time. If the comparisons for various coordinates/vertices are performed in an order corresponding to the configuration of clip bits register 660, the 2- or 4-bit results may be shifted into register 660 by clip bits write logic block 650. After nine successive clip tests, then, clip bits register 660 stores clip results for each coordinate of each vertex of a triangle received by graphics accelerator 112. It is noted that in an alternate embodiment, more than one coordinate for a given vertex may be tested in parallel by configuring clip testing unit 418 with another clip compare unit 610.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for performing clip testing of a vertex corresponding to a graphical primitive, said method comprising:

receiving a first coordinate value corresponding to a position of said vertex;

receiving a reference coordinate value corresponding to said position of said vertex;

generating a guard band reference coordinate value, wherein said first coordinate value, said reference coordinate value, and said guard band reference coordinate value each comprise an exponent portion and a mantissa portion; and comparing the following in parallel:
   (a) the mantissa portions of said first coordinate value and said reference coordinate value,
   (b) the exponent portions of said first coordinate value and said reference coordinate value,
   (c) the mantissa portions of said first coordinate value and said guard band reference coordinate value, and
   (d) the exponent portions of said first coordinate value and said guard band reference coordinate value.

2. The method of claim 1, wherein said position of said vertex is represented in homogeneous coordinates, and wherein said reference coordinate value is a W value.

3. The method of claim 1, wherein said comparisons are performed in four parallel-processing hardware comparators.

4. The method of claim 1, wherein said generating said guard band reference coordinate value includes multiplying said reference coordinate value by a fixed constant.

5. The method of claim 4, wherein said fixed constant is between 1.02 and 1.10.

6. The method of claim 1, further comprising receiving a scaling factor;

wherein said generating said guard band reference coordinate value includes multiplying said scaling factor by said reference coordinate value.

7. The method of claim 1, wherein said position of said vertex is represented in a floating point format, and wherein each position coordinate of said vertex includes an exponent portion and a mantissa portion.

8. The method of claim 7, wherein said generating said guard band reference coordinate value includes:

shifting said mantissa portion of said reference coordinate value by a first number of bits, thereby generating a shifted reference coordinate mantissa value;

adding said shifted reference coordinate mantissa value to said reference coordinate value, thereby generating said guard band reference coordinate value.

9. The method of claim 8, further comprising receiving a shift count equal to said first number of bits.

10. The method of claim 1, wherein said comparisons (a) and (b) indicate whether said first coordinate value is outside of a regular clipping space defined by a set of regular clipping planes.

11. The method of claim 10, wherein said comparisons (c) and (d) indicate whether said first coordinate value is outside of a guard band clipping space defined by a set of guard band clipping planes.

12. A graphics accelerator, comprising:

a clip testing unit for performing clip testing of coordinate values of a first vertex corresponding to a graphical object, said clip testing unit including:

an input unit for receiving a first coordinate value and a reference coordinate value of said first vertex;

a guard band generation unit configured to generate a guard band reference coordinate value in response to receiving said reference coordinate value;

a first clip compare unit coupled to receive said first coordinate value, and said reference coordinate value, wherein said first clip compare unit comprises a first comparator and a second comparator configured to operate in parallel, wherein said first comparator is configured to compare a mantissa portion or said first coordinate value and a mantissa portion of said reference coordinate value, wherein said second comparator is configured to compare an exponent portion of said first coordinate value and an exponent portion of said reference coordinate value; and a second clip compare unit coupled to receive said first coordinate value and said guard band reference coordinate value, wherein said second clip compare unit comprises a third comparator and a fourth comparator, wherein said third comparator is configured to compare said mantissa portion of said first coordinate value with a mantissa portion of said guard band reference coordinate value, and wherein said fourth comparator is configured to compare said exponent portion of said first coordinate value and an exponent portion of said guard band reference coordinate value, wherein said first and second clip compare units are configured to operate in parallel and to generate results substantially in parallel.

13. The graphics accelerator of claim 12, wherein said coordinate values of said first vertex are represented in homogeneous coordinates, and wherein said reference coordinate value is a W value.

14. The graphics accelerator of claim 12, wherein said wherein said first, second, third, and fourth comparators are configured to operate in concurrently and in parallel.

15. The graphics accelerator of claim 12, wherein said guard band generation unit is configured to generate said guard band reference coordinate value by multiplying said reference coordinate value by a fixed constant.

16. The graphics accelerator of claim 15, wherein said fixed constant is between 1.02 and 1.10.

17. The graphics accelerator of claim 12, wherein said guard band generation unit is coupled to receive a scaling factor;

wherein said generating said guard band reference coordinate value includes multiplying said scaling factor by said reference coordinate value.

18. The graphics accelerator of claim 12, wherein said coordinate values of said first vertex are represented in a floating point format, and wherein each coordinate value of said first vertex includes an exponent portion and a mantissa portion.

19. The graphics accelerator of claim 18, wherein said guard band generation unit is configured to shift said mantissa portion of said reference coordinate value by a first number of bits, thereby generating a shifted reference coordinate mantissa value, and wherein said guard band generation unit is further configured to add said shifted reference coordinate mantissa value to said reference coordinate value, thereby generating said guard band reference coordinate value.

20. The graphics accelerator of claim 19, wherein said guard band generation unit is coupled to receive a shift count equal to said first number of bits.

21. The graphics accelerator of claim 12, wherein results from said first and second comparators indicate whether said first coordinate value is outside of a regular clipping space defined by a set of regular clipping planes.

22. The graphics accelerator of claim 12, wherein results from said third and fourth comparators indicate whether said first coordinate value is outside of a guard band clipping space defined by a set of guard band clipping planes.

23. A computer system, comprising:
- a 3-D graphics accelerator usable for rendering a graphical object, said 3-D graphics accelerator including:
  - a clip testing unit for performing clip testing of coordinate values of a first vertex corresponding to a graphical object, said clip testing unit including:
    - an input unit for receiving a first coordinate value and a reference coordinate value of said first vertex;
    - a guard band generation unit configured to generate a guard band reference coordinate value in response to receiving said reference coordinate value;
    - a clip compare unit coupled to receive said first coordinate value, said reference coordinate value, and said guard band reference coordinate value, wherein said clip compare unit comprises:
      - a first comparator configured to compare a mantissa portion of said first coordinate value and a mantissa portion of said reference coordinate value,
      - a second comparator configured to compare an exponent portion of said first coordinate value and an exponent portion of said reference coordinate value,
      - a third comparator configured to compare the mantissa portion of said first coordinate value and a mantissa portion of said guard band reference coordinate value, and
      - a fourth comparator configured to compare the exponent portion of said first coordinate value and an exponent portion of said guard band reference coordinate value,
      - wherein said first, second, third, and fourth comparators are configured to operate in parallel and configured to perform said comparisons in parallel.

24. A graphics accelerator, comprising:

receiving means coupled to receive a first coordinate value and a reference coordinate value of a vertex corresponding to a graphical object;

guard band generating means for generating a guard band reference coordinate value;

a first clip testing means for performing a first clip test between said first coordinate value and said reference coordinate value, wherein said first clip test comprises comparing two or more portions of said first coordinate value and said reference coordinate value in parallel; and a second clip testing means for performing a second clip test between said first coordinate value and said guard band reference coordinate value, wherein said second clip test comprises comparing two or more portions of said first coordinate value and said guard band reference coordinate value in parallel;

wherein said first clip testing means and said second clip testing means are configured to perform said first clip test and said second clip test substantially concurrently and in parallel, wherein said first clip testing means and said second clip testing means are configured to complete said first clip test and said second clip test substantially concurrently, wherein said second clip test is an approximate test performed by comparing at least a subset of mantissa bits in said first coordinate value and said guard band reference coordinate value.

* * * * *

UNITED STATES PATENT AND TRADEMARK OFFICE
CERTIFICATE OF CORRECTION

PATENT NO. : 6,169,554 B1
DATED : January 2, 2001
INVENTOR(S) : MICHAEL F. DEERING It is certified that error appears in the above-identified patent and that said Letters Patent is hereby corrected as shown below:

In the Claims:

Claim 12, col. 18, line 25, please change the word "or" which appears as the first word of the line, to the word "of".

Signed and Sealed this

Twenty-ninth Day of May, 2001

Attest:

NICHOLAS P. GODICI

Attesting Officer

Acting Director of the United States Patent and Trademark Office